March 15, 1932.   L. H. BOWN   1,849,272
METHOD OF MAKING CERAMIC ARTICLES
Filed April 15, 1931
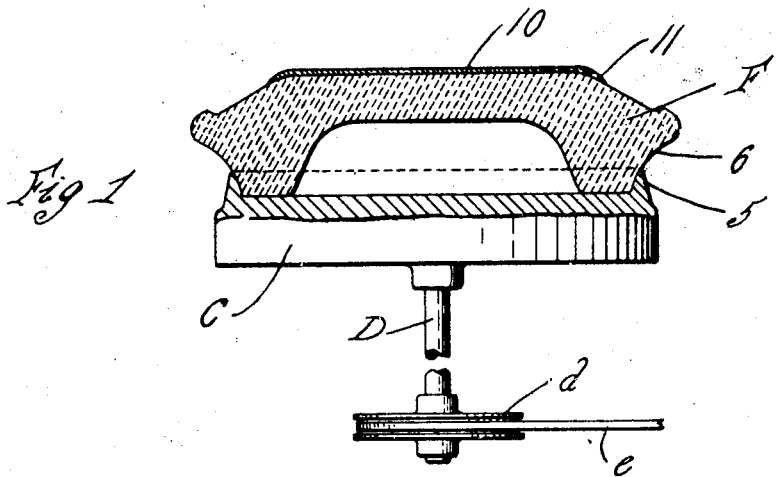
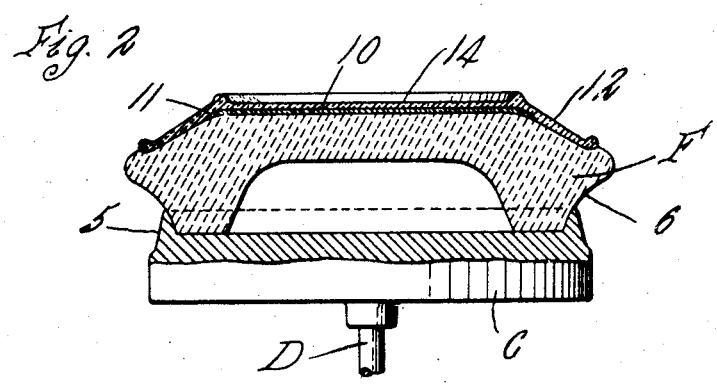
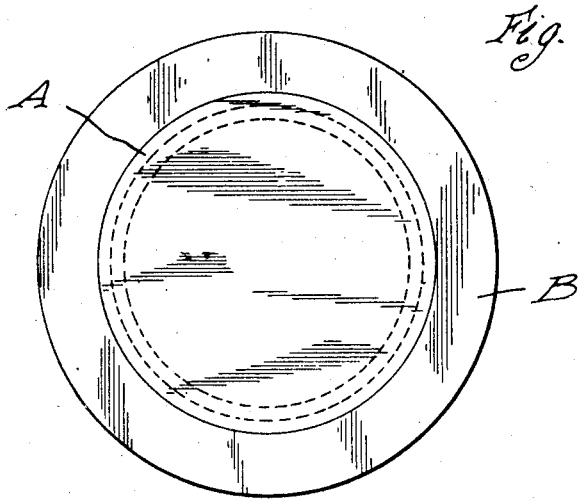
INVENTOR
Lewis H. Bown
by Parker & Truchnow
ATTORNEYS.

Patented Mar. 15, 1932

1,849,272

UNITED STATES PATENT OFFICE

LEWIS H. BOWN, OF BUFFALO, NEW YORK, ASSIGNOR TO BUFFALO POTTERY COMPANY, OF BUFFALO, NEW YORK

METHOD OF MAKING CERAMIC ARTICLES

Application filed April 15, 1931. Serial No. 530,193.

This invention relates to improvements in ceramic articles and to processes of making the same.

The objects of this invention are to make a ceramic article of pottery, in which a portion of the article is made of two or more layers of clay, which may be of different colors, to form an article having the appearance of having an inlaid part; also to provide an article of pottery having at least a portion thereof made of laminated structure to reinforce the same; also to provide an article of this kind in which the middle portion of one face of the article has a layer of ceramic substance contrasting with the edge and opposite face of the article; also to provide a process of making articles of this kind in accordance with which the articles can be efficiently produced so that the two layers become bonded together; also to produce a process of forming articles of this kind on a moisture absorbing mold to produce uniform articles; also to produce articles of this kind and processes of making the same in other respects hereinafter specified.

I have illustrated my invention in the accompanying drawings by showing the same applied to the making of china or procelain plates, but it will be understood that it is not intended to limit this invention for use only in connection with the making of plates, since the invention is obviously applicable to the manufacture of other articles of ceramic ware.

In the accompanying drawings:

Fig. 1 is an elevation, partly in section, of a wheel or revolving disk having a mold placed thereon and showing the first layer of ceramic substance formed thereon;

Fig. 2 is a similar view showing the completely formed plastic article on the mold ready for drying;

Fig. 3 represents a face view of a complete plate embodying this invention.

Referring to Fig. 3, an article of glazed chinaware is shown having a middle portion A on one face of the article formed of a ceramic substance differing in color from that of the body portion B of the article. For example, in the case of a glazed china dinner plate, the body portion A may be made from a china clay of one color and shaped so that this layer will in the final article be of approximately half the thickness of the article, and will form the middle portion of one face of the article. The body portion B and the middle portion A are united while the clay is still in wet and plastic form, so that the two layers become bonded together to form a unitary structure. The body portion B is made of a color differing from the middle portion A and the body portion will, consequently, form a border around the inner portion of the article on one face of the article, which border may be of a color contrasting with that of the middle portion of the article. When the article is formed, as hereinafter described, the other face of the article will be entirely formed by the body portion.

By bonding these two parts of the article together while the clay is wet or plastic, the two layers of clay are united in such a manner that they become integrally connected. The colors of the parts of the article are not merely superficially imposed on the articles, but extend through the articles. Consequently, color is not removed from the articles by scratching or rubbing the same or by breaking or chipping portions of the articles, since the portion of the article at the break or scratch will be the same in color as adjacent parts of the article. In addition to the pleasing color effects that may be produced by using two or more different colors of clay in the articles, it has been found that articles formed of two layers or laminations of clay or other ceramic material placed one on top of the other are stronger and have greater resistance to breaking than similar articles formed of a single mass of ceramic material. This may be due to the grain in the two layers extending in different directions or possibly to other causes. It has been observed that even if the two layers of the article are formed of the same material, a stronger article results than when the article is made as heretofore of a single mass of material.

Referring to Figs. 1 and 2, C represents a revolving ring or wheel, preferably made of metal and mounted on an upright spindle D provided with any suitable means for rotating the spindle, a pulley $d$ driven by a belt $e$ being shown to indicate one way in which the ring C may be rotated. F represents a mold made of a water absorbing substance, such for example as plaster of Paris. Preferably, the ring or wheel C has an upwardly extending annular beveled flange 5 into which a corresponding beveled annular face 6 of the mold F fits, to correctly center the mold with reference to the rotary table or ring C. The upper face of the mold may be of any desired contour, depending upon the shape of the article to be made, the particular mold shown being formed for the making of plates.

In the making of an article in accordance with my invention, a layer 10 of wet plastic ceramic substance, which is preferably smaller than the ultimate article to be made, is formed on the mold F. The forming of this layer may be effected in any suitable or desired manner. For example, a bat or mass of clay may be placed upon the mold and shaped in any suitable or desired manner. The layer 10 may, if desired, be trimmed by means of a suitable tool, not shown, shaped to give this layer a definite size and thickness, or if desired, the layer may be shaped by hand. It is also possible to form the layer 10 on the mold by dipping the middle portion of the mold into a slip or mass of clay suspended in water. Because of the water absorbing ability of the mold F, water will be absorbed from the slip touching the mold, leaving a deposit of clay on the surface of the mold. This deposit may be built up to any desired thickness by leaving the mold in contact with the slip for greater or less periods of time, and the layer thus built up may then be shaped in any desired manner or trimmed with a forming tool until it has the thickness and size desired. The edge portions 11 of this layer 10 are preferably beveled or tapered down for reasons hereinafter stated.

After the ceramic substance for forming the layer 10 has been placed on the mold F, it is quickly shaped to the desired form, and before much of the moisture has been withdrawn from the layer 10 by the mold F, the ceramic substance for the body portion of the article is placed on the mold, the body portion also being in a wet and plastic condition. This may be done in the usual manner in which articles of this kind have heretofore been made, for example, by forming a flat layer or bat of clay of larger size than that required for forming the body portion of the article and throwing this bat down upon the mold. The contour of the body portion of the article can then be formed in the same manner as has heretofore been done in connection with making articles of this kind from a single bat of clay. By throwing the bat upon the mold and upon the layer 10 thereon, the plastic ceramic substance in the bat will conform itself to the contour of the mold and of the layer 10 thereon, and since the two masses of clay are wet and plastic, they will become bonded together into a unitary structure. The upper face of the body portion of the article on the mold may then be formed or trimmed into the desired shape and the article is preferably left on the mold until sufficient moisture has been withdrawn from the body so that the article will retain its shape when removed from the mold. By providing a beveled or tapering edge 11 on the layer 10, the extreme edge of the layer 10 will become so bonded with the body portion 12 that no ridge or groove will be formed at the junction of this edge with the body portion. Preferably, the thickness of the layer 10 and the intermediate portion 14 of the body 12 of the article are substantially equal.

After the article has been dried, it can be treated in the usual manner for finishing the same, including the steps of final trimming, firing, glazing, etc.

The clay or ceramic material used in making the layer 10 is preferably of the same nature and characteristics as that used in making the body portion 12, so that all parts of the resulting article will have similar characteristics with reference to expansion and contraction when subjected to changes in temperature, and so that the several parts of the article will shrink equally during drying and will not break during firing. The two ceramic substances used may, however, be of different color to produce a multi-color effect in the finished article. The article has herein been described as made of two layers of different colors, but it will be obvious that three or more ceramic substances of different colors may be employed without departing from this invention by superimposing successively larger number of layers on the mould.

I claim as my invention:

1. The process of making articles of pottery, including placing on a mold a substantial layer of wet plastic clay, forming the clay into the shape desired and removing excess clay, bevelling the edges of said layer, placing on said layer of clay while the same is still wet, any desired number of layers of similar composition and consistency, shaping said successive layers, removing moisture from the layers, and firing the article.

2. A process of making ceramic articles, including forming on a mold a substantial layer of a wet plastic ceramic substance, then placing on the mold while said layer is still wet a larger layer of a wet plastic ceramic substance of similar composition and consistency but different color from said first substance to form a bond between the two layers, forming the second layer into the desired shape, extracting moisture from the article, and glazing and firing the article.

3. A process of making articles of pottery having laminated portions, including forming on a mold a substantial layer of wet plastic clay of a size less than that of the ultimate article, and superimposing upon said layer while said first layer is still wet a second layer of larger size and of a wet clay of different color from that of the clay of the first layer but of similar composition and consistency to form a bond between the two layers of wet clay, said layers in the laminated portions of the article being of approximately equal thickness, extracting moisture from the article and firing the article.

4. A process of making ceramic articles, including forming a substantial layer of a web plastic substance, then placing on said layer while said layer is still wet another layer of wet plastic ceramic substance of similar composition and consistency, and forming the second layer of the desired shape, extracting moisture from the article and firing, whereby an article of greater strength for the same thickness is obtained.

LEWIS H. BOWN.